No. 889,974. PATENTED JUNE 9, 1908.
F. SCHREIDT.
FISHING REEL.
APPLICATION FILED AUG. 19, 1907.
2 SHEETS—SHEET 1.
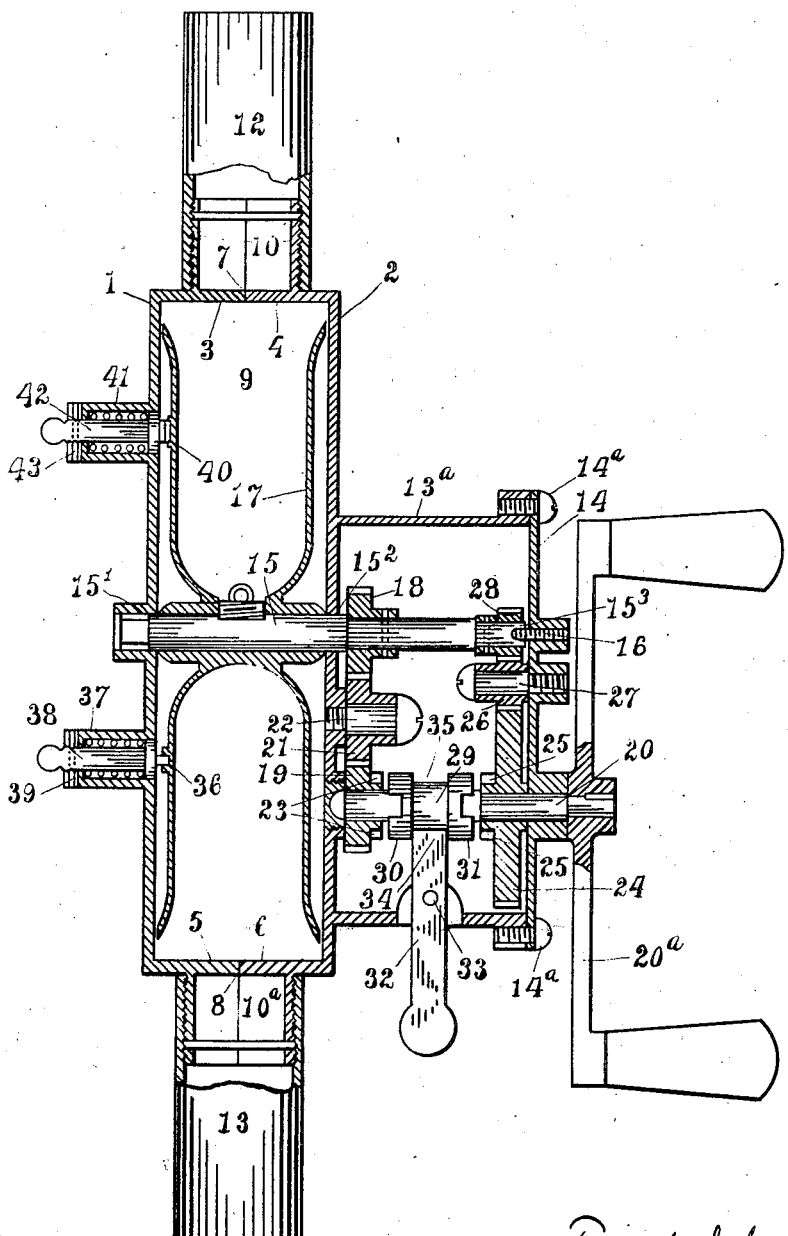
Witnesses
David J. Davies
Pearl Ackerman
Inventor
Frank Schreidt
By John H. Coss
his Attorney

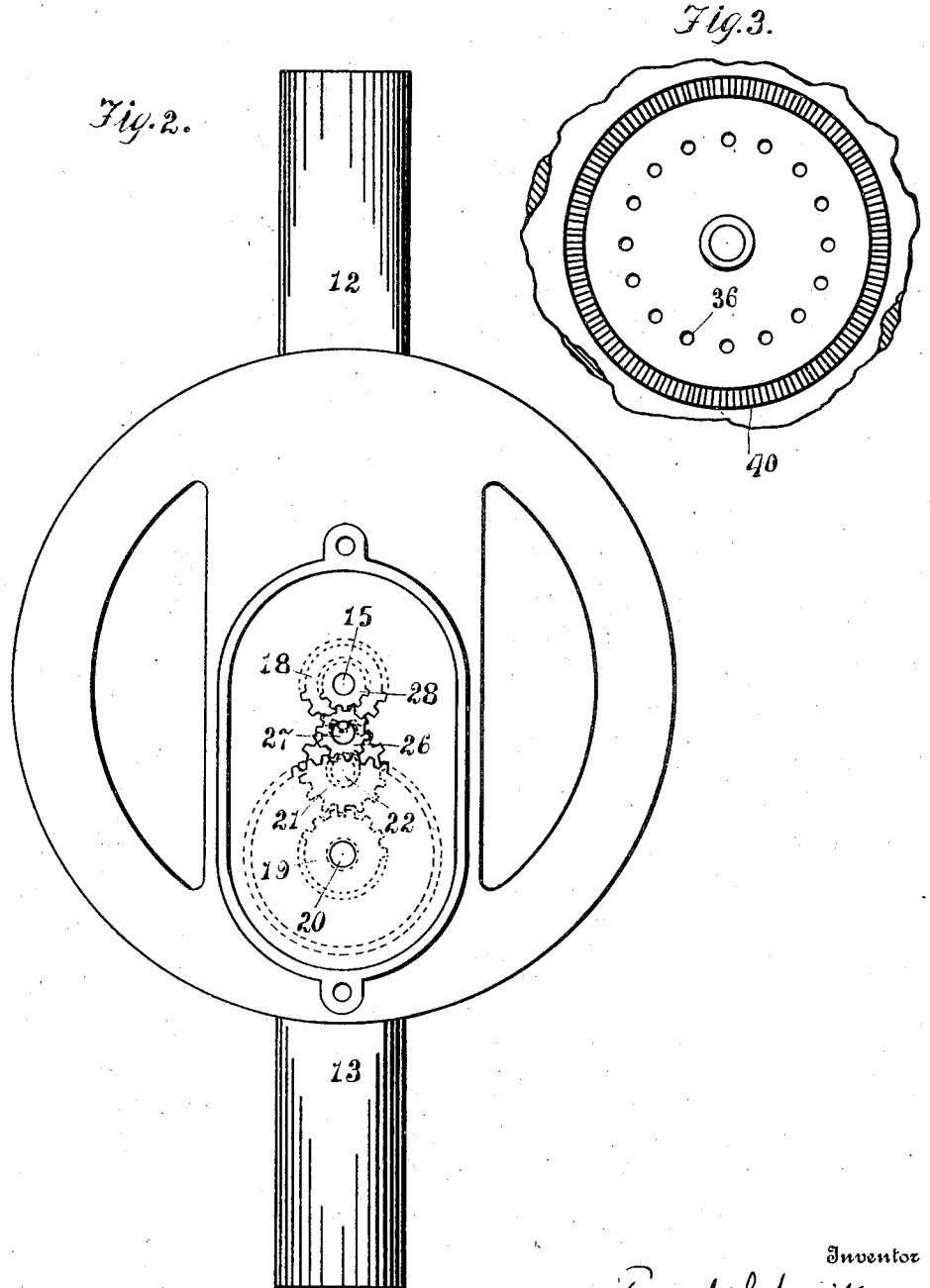

UNITED STATES PATENT OFFICE.

FRANK SCHREIDT, OF MANSFIELD, OHIO.

FISHING-REEL.

No. 889,974.

Specification of Letters Patent.

Patented June 9, 1908.

Application filed August 19, 1907. Serial No. 389,318.

*To all whom it may concern:*

Be it known that I, FRANK SCHREIDT, citizen of the United States, residing at Mansfield, in the county of Richland and State of Ohio, have invented certain new and useful Improvements in Fishing-Reels, of which the following is a specification.

My invention is an improvement of application for Letters Patent Serial No. 329,160, filed Aug. 4, 1906, and relates to that class of fishing reels in which facilities are provided for casting the line direct from the spool, and in which means are provided to increase or decrease the speed of the winding spool through suitable clutch mechanism.

It is well known that in order to provide an efficient and convenient fishing reel that a differential movement must be provided for the spool to permit of the proper and effectual handling of all sizes of fish. In order to do this properly it is necessary to increase or decrease the speed of the winding spool at the will of the operator without increasing the speed of the operating lever.

The objects of my improvements are therefore: first, to construct a fishing reel that will permit the casting of the fishing line from a winding spool; second, to afford facilities for connecting the spool through suitable clutch mechanism to the operating lever to obtain a direct pull on the line; third, to provide an audible alarm to indicate when the fishing line is being drawn from the spool; fourth, to provide a suitable means for locking the spool.

The primary object of my invention is to provide three separate and distinct movements or speeds for the spool, as follows; first, to rotate the spool for casting purposes independent of the reel mechanism; second, to permit the fishing line to be wound on the spool by the application of direct power through the medium of the operating lever; third, to increase the speed of the spool without increasing the speed of the operating handle at the will of the operator and through the medium of suitable gearing preferably quadrupling the speed of the spool.

I attain these and other objects by the mechanism illustrated in the accompanying drawings in which:

Figure 1, is a central sectional front elevation of my device showing a detail view of the operating mechanism. Fig. 2, is a side elevation with the gear case cover removed showing the relative position of the shafts and gearing. Fig. 3, is a side view of a central section of the spool showing the rack and notches.

In the construction of my device I employ a casing comprising two parts, 1 and 2 having inwardly extending lugs 3—4—5 and 6 which contact with each other at the points 7 and 8 leaving a space 9 between them.

The lugs have outwardly extending circular portions 10 and $10^a$ made integral with the lugs forming part of the casing and bisected at the same points as the lugs.

The peripheries of the circular portions 10 and $10^a$ are exteriorly screw-threaded and adapted to engage with the inner peripheries of the bushings 12 and 13 thereby securing and rigidly retaining the parts together forming the casing and leaving the space 9 hereinbefore referred to.

An elongated recessed portion $13^a$ made integral with the part 2 of the casing is provided with a suitable cap 14 rigidly secured thereto by means of screws $14^a$. The shaft 15 is fitted to and adapted to rotate in suitable bearings $15'$ and $15^2$ formed in the parts 1 and 2 of the casing. The end $15^3$ of the shaft 15 is journaled on a suitable pivot 16 rigidly secured in the cap 14 and adapted to be adjusted therein by means of screw-threads. A reel 17 is fitted to and rigidly mounted on the shaft 15 and is adapted to rotate therewith.

The shaft 15 is provided with a pinion 18 which is secured thereto. A pinion 19 is journaled on the shaft 20 adjacent to part 2 of the casing. The shaft 20 is journaled in bearings formed in the cap 14 and in part 2 of the casing and is located below the shaft 15. An operating lever $20^a$ is secured to the projecting end of the shaft 20.

An intermediate pinion 21 is journaled on a suitable bolt 22 rigidly secured to the casing. The pinion, 19 meshes with the pinion 21 which in turn meshes with the pinion 18 secured on shaft 15.

Wings 23 are made integral with the pinion 19 and extend outwardly therefrom. A large gear wheel 24 is journaled upon the shaft 20 adjacent to the inner face of the cap 14 and is provided with wings 25 which extend outwardly therefrom.

An intermediate pinion 26 is journaled on a suitable bolt 27 rigidly secured to the cap 14. The large gear wheel 24 meshes with the pinion 26 which in turn meshes with a suitable pinion 28 secured on the shaft 15 adjacent to the cap 14.

A sleeve 29 is slidably mounted on the shaft 20 and is adapted to be rotated therewith. Wings 30 and 31 are made integral with said sleeve and are adapted to engage with the wings 23 and 25 of the pinion 19 and gear wheel 24. A lever 32 is pivotally journaled on the pin 33 and having its upwardly extending free end 34 fitted to the annular groove 35 formed in the sleeve 29 to reciprocate the said sleeve upon the shaft 20, thereby throwing the wings 30 and 31 in and out of contact with the wings 23 and 25 formed on the pinion 19 and gear wheel 24 respectively.

When the wings 31 are brought in contact with the wings 25 increased or multiple speed is transmitted to the shaft 15. When the wings 30 are brought in contact with the wings 23 the same speed is transmitted to the shaft 15 as is imparted to the operating lever 20ª as the pinions transmitting the movement to the shaft 15 are of the same size.

When it is desired to cast the line from the spool independent of the high or low speed mechanism, the lever 32 is thrown to its central position as shown in the drawing. This disengages the wings of the sleeve from the high and low speed gearing and permits the spool to rotate independent of the high or low speed mechanism.

An annular series of notches 36 is formed in the spool 17. A boss 37 projects from the side of the part 1 of the casing and is provided with a spring actuated pin 38 having its end in the path of the notches 36 and adapted to register therewith. It will be observed that this is a great convenience in transporting the reel from place to place, or when the line is not in use as it securely locks the spool and prevents the line from being unwound therefrom.

The pin is withdrawn from the notches by compressing the spring 38 and is held in or out of contact therewith by the pin 39 which rests in slots of different depths formed in the outer end of the boss 37.

In order to provide a means of giving an audible alarm when the fishing line is being drawn from the reel, I form a modified rack 40 on the spool 17. An outwardly projecting portion 41 if formed on the path of the rack and a pin 42 having a flattened end is inserted in a suitable aperture provided in the center of the projecting portion. The pin 42 is held under spring tension and is brought in or out of contact with the modified rack by pulling upward on the pin and permitting the pin to be held in or out of contact by the pin 43 which rests in slots of different depths formed at right angles with each other on the outer end of the boss 41.

When the fishing line is being drawn from the spool the pin 42 is in contact with the modified rack and as the spool is rotated an audible alarm is given through the medium of the pin contacting with the rack.

Having fully described my invention, what I claim and desire to secure by Letters Patent is:

1. In a fishing reel comprising a two-part casing, a shaft journaled in said casing, a spool secured thereto, an auxiliary shaft journaled to said casing, a sleeve slidably fitted to said auxiliary shaft provided with clutch members, a cap, variable speed gearing mounted on the casing and cap and provided with clutch members to engage with clutch members of the sleeve to impart variable speed to the spool, an operating handle to reciprocate the sleeve for the purpose set forth.

2. In a fishing reel comprising a two-part casing, a shaft, a spool journaled within said casing and mounted upon said shaft, an auxiliary shaft, a cap, different size gearing mounted on said casing and cap, an operating handle, a clutch mechanism adapted to be alternately thrown in and out of engagement with said gearing through the medium of said operating handle to change the speed of the spool.

3. In a fishing reel the combination of a two-part casing, a shaft mounted upon the casing with one end projecting therefrom, two pinions carried by said shaft, an auxiliary shaft mounted on said casing parallel with said main shaft, two pinions carried by said auxiliary shaft, intermediate pinions meshing with the pinions mounted on the above named shafts, a clutch mechanism slidably mounted on one of said shafts and adapted to engage with said gearing.

4. In a fishing reel, a casing, shafts mounted on said casing, a spool mounted on one shaft, different size gearing mounted on said shafts and spaced apart, a clutch mounted on one of said shafts and interposed between said gearing, intermediate gears to impart movement from one shaft to the other, an operating handle, means to throw said clutch in and out of engagement with the different size gearing to increase or decrease the speed of the spool and to permit independent rotation of the spool for casting purposes.

5. In a fishing reel, a casing, a recessed portion made integral with the said casing, an axis journaled in said casing and recessed portion, a pinion secured on said axis, a spool secured to said axis, a shaft journaled to one side of said axis, a pinion mounted on said shaft, wings made integral with said pinion, an intermediate pinion secured to said casing, a sleeve having wings made integral therewith slidably mounted on said shaft, a lever secured on said shaft, means for reciprocating the said sleeve.

6. In a fishing reel, a casing, a shaft journaled in said casing, a spool mounted thereon, an auxiliary shaft journaled to said casing, pinions carried by said shafts and located at points diametrically opposed to each other and spaced apart, intermediate pinions adapted to mesh with the pinions on the shafts whereby simultaneous rotation of the shafts can be obtained, means to impart movement to either set of pinions and to permit independent movement of the spool for casting purposes.

7. In a fishing reel, a casing, a spool journaled therein, a shaft secured to said spool, pinions mounted on said shaft and spaced apart, an auxiliary shaft journaled upon said casing, pinions mounted thereon and spaced apart to aline with the pinions on the main shaft, an operating handle, intermediate pinions mounted upon the casing meshing with the pinions on said shafts, a double clutch slidably mounted on the auxiliary shaft and adapted to engage with either set of gearing to impart movement to the spool.

8. A fishing reel comprising a two part casing, a spool rotatably mounted within said casing, a main shaft secured to said spool leaving one end projecting therefrom, an auxiliary shaft mounted on the casing parallel with the main shaft, different sets of variable size gearing mounted on said shafts, intermediate gearing mounted on the casing and meshing with the above mentioned gearing, a double clutch, an operating handle, means to alternately engage said clutch with the different sets of gearing or to disengage them from both for the purpose described.

9. In a fishing reel, the combination of a two-part casing and a spool, two sets of different size gearing mounted on said casing and spaced apart whereby independent movement can be imparted to either set, a sliding double clutch adapted to be alternately engaged with either set of gearing or disengaged from both as described and for the purpose set forth.

In testimony whereof I affix my signature in presence of two witnesses.

FRANK SCHREIDT.

Witnesses:
 JOHN H. COSS,
 PEARL ACKERMAN.